(12) United States Patent
Koshijima et al.

(10) Patent No.: US 11,878,566 B2
(45) Date of Patent: Jan. 23, 2024

(54) HEAT EXCHANGE DEVICE FOR VEHICLES

(71) Applicant: NISSAN MOTOR CO., LTD., Yokohama (JP)

(72) Inventors: Masashi Koshijima, Kanagawa (JP); Riyako Uehara, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 140 days.

(21) Appl. No.: 17/639,423

(22) PCT Filed: Sep. 2, 2019

(86) PCT No.: PCT/IB2019/000836
§ 371 (c)(1),
(2) Date: Mar. 1, 2022

(87) PCT Pub. No.: WO2021/044177
PCT Pub. Date: Mar. 11, 2021

(65) Prior Publication Data
US 2023/0347705 A1    Nov. 2, 2023

(51) Int. Cl.
*B60H 1/00* (2006.01)
*B60K 6/46* (2007.10)
*F02B 29/04* (2006.01)
*F01P 3/20* (2006.01)
*B60K 11/04* (2006.01)

(52) U.S. Cl.
CPC ..... *B60H 1/00328* (2013.01); *B60H 1/00385* (2013.01); *B60K 6/46* (2013.01); *B60K 11/04* (2013.01); *F01P 3/20* (2013.01); *F02B 29/0462* (2013.01); *B60Y 2200/92* (2013.01); *F01P 2060/02* (2013.01)

(58) Field of Classification Search
CPC .. B60H 1/00328; B60H 1/00385; B60K 6/46; B60K 11/04; B60Y 2200/92; F01P 2060/02; F01P 3/20; F02B 29/0462
See application file for complete search history.

(56) References Cited

U.S. PATENT DOCUMENTS

| | | | |
|---|---|---|---|
| 2012/0018127 A1* | 1/2012 | Iwasaki | F02M 26/32 165/104.14 |
| 2014/0325980 A1* | 11/2014 | Iwasaki | F02M 26/17 60/599 |
| 2015/0040874 A1 | 2/2015 | Isermeyer et al. | |
| 2015/0165868 A1* | 6/2015 | Kim | B60H 1/00764 62/89 |
| 2016/0010534 A1 | 1/2016 | Kawakami et al. | |

FOREIGN PATENT DOCUMENTS

| | | |
|---|---|---|
| JP | 2010-249129 A | 11/2010 |
| JP | 2014-173748 A | 9/2014 |
| WO | WO 2013/073553 A1 | 5/2013 |

* cited by examiner

*Primary Examiner* — Shafiq Mian
(74) *Attorney, Agent, or Firm* — Foley & Lardner LLP

(57) ABSTRACT

An intercooler is a two-stage water-cooled intercooler having a first core and a second core. A condenser for an air conditioner includes a water-cooled condenser and an air-cooled condenser. A drive system electrical component such as an inverter, the second core, and the water-cooled condenser are cooled by a second cooling water circuit including a sub-radiator. Cooling is carried out by the second cooling water circuit including the sub-radiator. The sub-radiator and the air-cooled condenser are located in front of a main radiator.

5 Claims, 7 Drawing Sheets

HEAT EXCHANGE DEVICE FOR VEHICLES

TECHNICAL FIELD

The present invention relates to a heat exchange device for vehicles which includes a radiator for an engine, a condenser for an air conditioner, and a radiator for a water-cooled intercooler.

BACKGROUND ART

An engine with a supercharger may include an intercooler structured to cool intake air heated due to supercharging, before introducing the intake air into a combustion chamber. The intercooler may be an air-cooled intercooler structured to perform heat exchange between the heated supercharge intake air and outside air, or a water-cooled intercooler structured to perform heat exchange between the heated supercharge intake air and cooling water. The water-cooled intercooler requires a radiator structured to cool the cooling water, which serves as coolant, by outside air.

In addition, a vehicle generally includes an air conditioner, and requires a condenser structured to condense coolant by heat exchange with outside air. The condenser is ordinarily disposed to overlap with a radiator for the engine.

Patent Document 1 discloses a high temperature side heat exchanger in which first cooling water flows and a low temperature side heat exchanger in which second cooling water flows, wherein these heat exchangers are arranged in series inside a case in which intake air flows. The first cooling water is engine cooling water relatively high in temperature, and is cooled by a radiator. The second cooling water is maintained relatively low in temperature, and is cooled by a secondary radiator. The secondary radiator is arranged adjacently to a condenser for an air conditioner in a vertical direction.

However, this art of Patent Document 1 fails to realize such layout to arrange the secondary radiator and the condenser adjacently in the vertical direction, in case that the condenser cannot be downsized due to a high thermal load in the air conditioner.

Patent Document 2 discloses a condenser for an air conditioner, which includes a combination of an air-cooled condenser and a water-cooled condenser. The water-cooled condenser is cooled, together with a strong electricity system device, by cooling water flowing therein separately from an engine cooling water system. The cooling water that has cooled the water-cooled condenser and the strong electricity system device is cooled by a secondary radiator. The secondary radiator and the air-cooled condenser are arranged adjacently to each other in a vertical direction.

However, such attempt to cool an additional water-cooled condenser with use of a separated cooling circuit as disclosed by Patent Document 2 results in complication in configurations.

In view of the foregoing, it is desirable to provide a heat exchange device for vehicles which is further developed from known configurations above.

PRIOR ART DOCUMENT(S)

Patent Document(s)

Patent Document 1: JP 2010-249129 A
Patent Document 2: JP 2014-173748 A

SUMMARY OF THE INVENTION

Problem(s) to be Solved by the Invention

According to one aspect of the present invention, a heat exchange device for a vehicle includes: a water-cooled engine structured to be cooled by first cooling water; a two-stage type water-cooled intercooler that is structured to cool supercharge intake air supplied to the water-cooled engine, and includes a first core structured to perform cooling with the first cooling water and a second core structured to perform cooling with second cooling water, wherein the first core is disposed upstream on an intake path with respect to the second core; a water-cooled condenser structured to cool coolant for an air conditioner with use of the second cooling water that is introduced parallelly into the water-cooled condenser and the second core of the two-stage type water-cooled intercooler; a first radiator disposed at a position to receive wind due to vehicle traveling, and structured to cool the first cooling water by heat exchange with air; a second radiator disposed in front of the first radiator so as to overlap with a part of the first radiator, and structured to cool the second cooling water by heat exchange with air; and an air-cooled condenser disposed in front of the first radiator adjacently to the second radiator so as to overlap with a part of the first radiator, and arranged in series with the water-cooled condenser in a coolant circuit for the air conditioner, and structured to cool the coolant by heat exchange with air.

The first cooling water flows in the water-cooled engine and cools it, while flowing in the first core of the water-cooled intercooler and cooling the supercharge intake air. The first cooling water that has been heated dissipates heat thereof in the first radiator.

The second cooling water flows in the second core of the water-cooled intercooler, and cools the supercharge intake air. The second cooling water that has been heated dissipates heat thereof in the second radiator. In the water-cooled intercooler, the supercharge intake air that has been heated is first cooled by the first cooling water in the first core, and next further cooled by the second cooling water in the second core. This serves to efficiently cool the supercharge intake air to a low temperature, because the second cooling water is allowed to be maintained lower in temperature than the first cooling water.

The second cooling water flows into the water-cooled condenser, parallelly to the second core of the water-cooled intercooler, and exchanges heat with the coolant for the air conditioner which has been heated. Accordingly, also the water-cooled condenser dissipates heat thereof in the second radiator. This serves to downsize the air-cooled condenser in comparison with a size required in view of a heat load in the air conditioner.

The first cooling water absorbs a part of heat of the supercharge intake air. Accordingly, the second radiator used for cooling the second cooling water is allowed to be downsized, even after considering heat of the water-cooled condenser. Furthermore, the second cooling water flows parallelly in the water-cooled condenser and the second core of the water-cooled intercooler. This serves to supply the second cooling water to these two at approximately equally low temperatures, and thereby sufficiently cool the supercharge intake air, while effectively cooling and condensing the coolant for the air conditioner in the water-cooled condenser.

This serves to downsize both of the air-cooled condenser and the second radiator, and allows a layout in which the air-cooled condenser and the second radiator are arranged to be adjacent to each other and overlap with the first radiator in a frontward and backward direction: in other words, a layout to arrange heat exchangers used for various heat dissipations, in two tiers in the frontward and backward direction of the vehicle. This serves to reduce the vehicle in dimension in the frontward and backward direction, while reducing the vehicle in ventilation resistance against wind due to vehicle traveling, cooling wind from a fan, etc.

MODE(S) FOR CARRYING OUT THE INVENTION

The following describes a first embodiment of the present invention with reference to the drawings.

Figure 1:
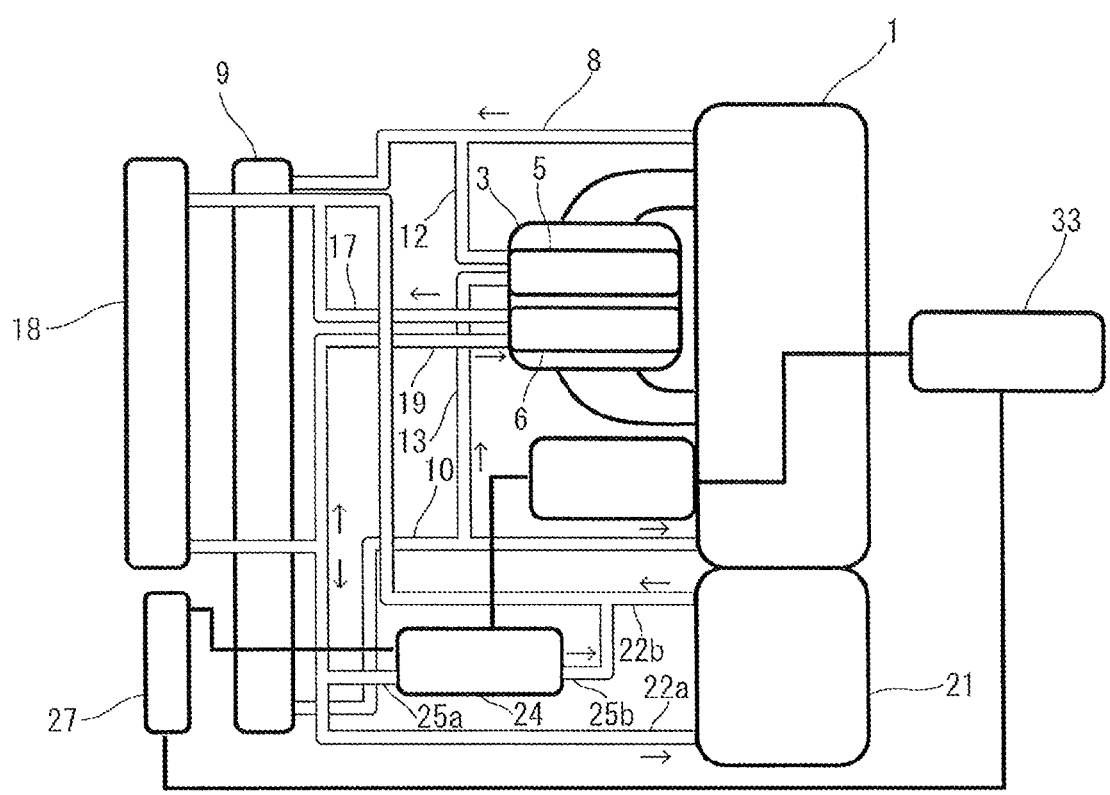
FIG. 1 is a schematic view showing a whole picture of a heat exchange device for a vehicle according to the present invention.
Figure 3:
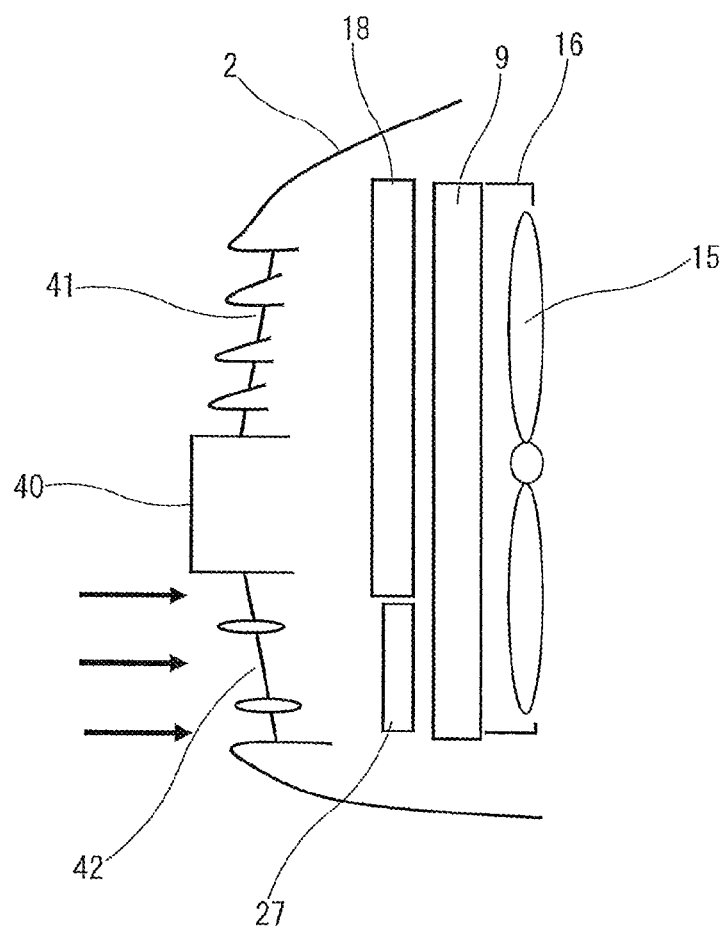
FIG. 3 is a schematic view focused on heat exchangers in FIG. 1 when viewed from a lateral side of the vehicle.

FIG. 1 is a schematic view of a whole picture of a heat exchange device for a vehicle according to the present invention, and illustrates a front section of the vehicle when viewed from a lateral side thereof. FIG. 3 shows how heat exchangers in the heat exchange device are arranged inside a vehicle body 2. The vehicle of the present embodiment is a so-called series hybrid vehicle including an engine (i.e. an internal combustion engine) 1 for generation that is mounted in a horizontal attitude in vehicle body 2, and travels by driving a motor with electric power generated in a generator not shown that is driven by engine 1, where the generated electric power is temporarily stored in a battery not shown. Engine 1 is a water-cooled engine including a water jacket therein, and may be a spark ignition type engine or a diesel engine which uses gasoline as fuel. Engine 1 includes a supercharger not shown such as a turbocharger or a mechanical supercharger, and includes a water-cooled intercooler 3 structured to cool supercharge intake air heightened in temperature and pressure by the supercharger.

Figure 2:
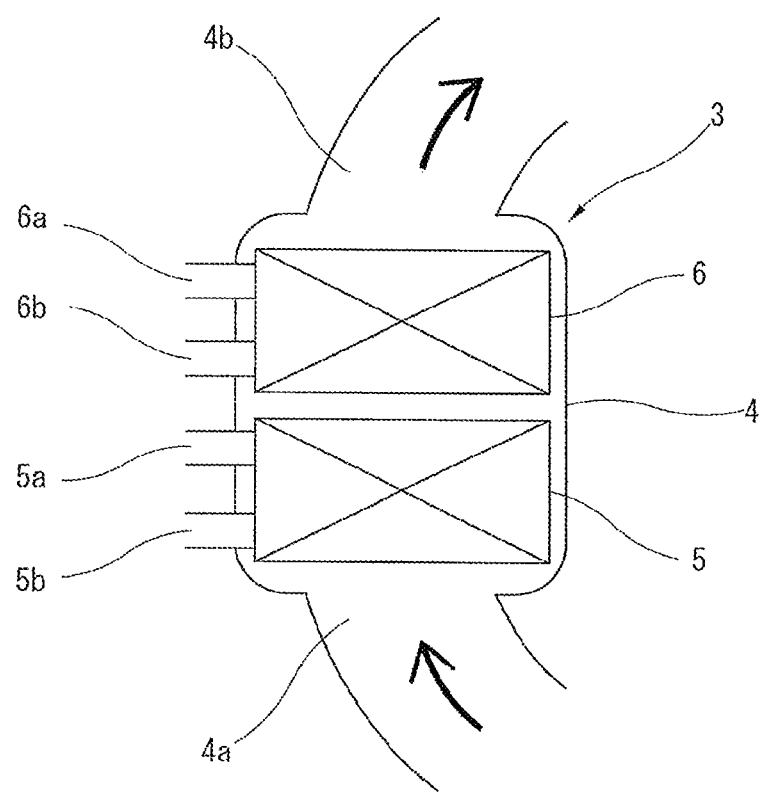
FIG. 2 is a schematic view showing configurations of a two-stage type water-cooled intercooler.

Water-cooled intercooler 3 includes a housing 4, a first core 5, and a second core 6, as schematically shown in FIG. 2. Housing 4 includes an inlet 4a and an outlet 4b where the supercharge intake air flows from inlet 4a to outlet 4b. First core 5 is positioned adjacently to inlet 4a, and includes a cooling water inlet 5a and a cooling water outlet 5b. Second core 6 is positioned adjacently to outlet 4b, and includes a cooling water inlet 6a and a cooling water outlet 6b. In first core 5, first cooling water (i.e. engine cooling water) relatively high in temperature flows. In second core 6, second cooling water (i.e. intercooler cooling water) maintained relatively low in temperature flows. Accordingly, the supercharge intake air heated due to supercharging is cooled to an extent by the engine cooling water in first core 5 positioned upstream, and thereafter further cooled by the intercooler cooling water lower in temperature, in second core 6 positioned downstream. Thus, intercooler 3 serves as a two-stage type water-cooled intercooler, where a ratio between first core 5 and second core 6 is not limited to 1:1. The engine cooling water and the intercooler cooling water are, for example, ethylene glycol solutions containing appropriate additives, and may be same with each other or different from each other in composition, concentration, etc.

Figure 4:
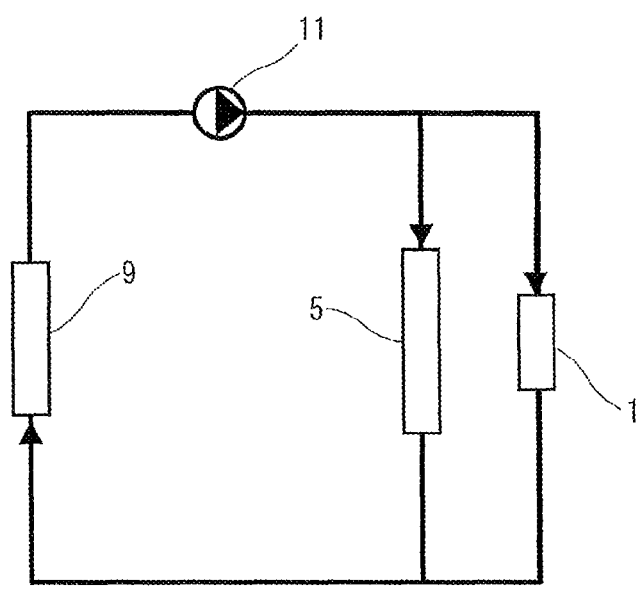
FIG. 4 is a circuit diagram of a first cooling water circuit.

The engine cooling water circulates in a first cooling water circuit, as shown in a circuit diagram of FIG. 4. The first cooling water circuit includes: the water jacket inside the engine 1; an outlet passage 8 in which the cooling water heated in the water jacket of engine 1 flows; a first radiator, i.e. a primary radiator 9, structured to cool the engine cooling water by heat exchange with outside air; an inlet passage 10 via which the cooling water returns from primary radiator 9 to engine 1; and a water pump 11 (see FIG. 4) disposed inside the engine 1. In addition, first core 5 of water-cooled intercooler 3 is disposed to connect outlet passage 8 to a section of inlet passage 10 downstream with respect to water pump 11, via a first core inlet passage 12 and a first core outlet passage 13.

Thus, according to the present embodiment, as shown in the circuit diagram of FIG. 4, first core 5 and the water jacket of engine 1 are arranged in parallel in a region downstream with respect to water pump 11, such that the engine cooling water cooled due to heat dissipation in primary radiator 9 flows parallelly into first core 5 and the water jacket. First core 5 and the water jacket may be controlled in cooling water flow rate therein, with appropriate use of devices not shown such as a temperature sensor and an electromagnetic valve. The water pump in engine 1 may be an electric one or a mechanical one.

Primary radiator 9 is disposed in the front section of vehicle body 2 so as to receive wind due to vehicle traveling, similarly to a general arrangement of a radiator in a vehicle. As shown in FIG. 3, primary radiator 9 is accompanied by electric fans 15 disposed behind, i.e. in a rear side, of primary radiator 9. According to the first embodiment, a pair of electric fans 15 are arranged in a vehicle width direction, in correspondence to a shape of primary radiator 9 that is elongated in the vehicle width direction. Electric fans 15 and a rear face of primary radiator 9 interpose therebetween a shroud 16 having a rectangular shape.

Figure 5:
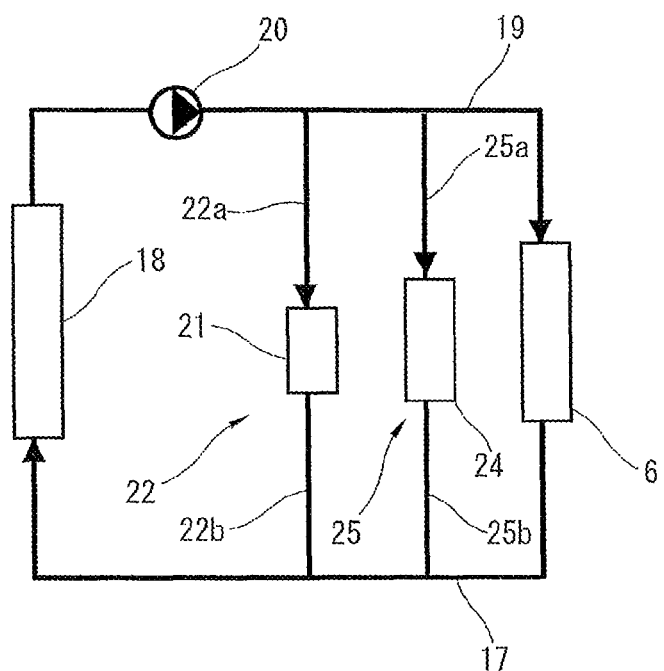
FIG. 5 is a circuit diagram of a second cooling water circuit.

The intercooler cooling water circulates in a second cooling water circuit, as shown in a circuit diagram of FIG. 5. The second cooling water circuit includes: second core 6 of intercooler 3 described above; a second core outlet passage 17 in which the cooling water heated in second core 6 flows; a second radiator, i.e. a secondary radiator 18, structured to cool the intercooler cooling water by heat exchange with outside air; a second core inlet passage 19 via which the cooling water cooled in secondary radiator 18 flows into second core 6; and an electric secondary water pump 20 (see FIG. 5) disposed in second core outlet passage 17.

The second cooling water circuit further includes a drive system electrical component cooling water circuit 22 including an inlet passage 22a and an outlet passage 22b, for cooling of drive system electrical components 21 such as an inverter, a motor, and a generator in a drive system of the series hybrid vehicle. Drive system electrical component cooling water circuit 22 is arranged in parallel with second core 6.

Furthermore, vehicle body 2 contains a water-cooled condenser 24 at an appropriate position therein. Water-cooled condenser 24 is structured to cool coolant of the air conditioner for a vehicle interior, with use of the intercooler cooling water. To cause the intercooler cooling water to flow in water-cooled condenser 24, the second cooling water circuit includes a condenser cooling water circuit 25 including an inlet passage 25a and an outlet passage 25b. As shown in the circuit diagram of FIG. 5, condenser cooling water circuit 25 is arranged in parallel with second core 6 and drive system electrical component cooling water circuit 22.

Thus, due to pump action of secondary water pump 20, the intercooler cooling water cooled in secondary radiator 18 flows parallelly into second core 6 of intercooler 3, drive system electrical components 21, and water-cooled condenser 24.

Second core 6, drive system electrical components 21, and water-cooled condenser 24 may be controlled in cooling water flow rate therein, by devices not shown such as a temperature sensor and an electromagnetic valve.

The intercooler cooling water circulating in the second cooling water circuit is controlled to be lower in temperature than the engine cooling water circulating in the first cooling water circuit. For example, the engine cooling water is controlled to have a temperature within about 70 to 90° C. at an outlet of primary radiator 9 under a target temperature of 80° C., while the intercooler cooling water is controlled to have a temperature within about 50 to 55° C. at an outlet of secondary radiator 18.

Figure 6:
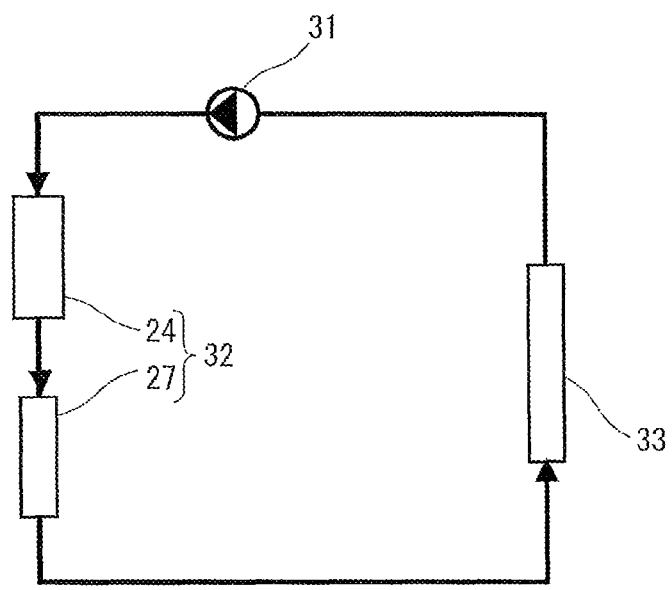
FIG. 6 is a circuit diagram of a coolant circuit for an air conditioner.

Water-cooled condenser 24 is composed of, for example, a housing in which the cooling water flows and a core in which the coolant flows, wherein the core is contained in the housing. Water-cooled condenser 24 is structured to condense the coolant by heat exchange between the cooling water and the coolant in gas phase, and includes a liquid tank not shown to temporarily store the condensed coolant in liquid phase. FIG. 6 schematically shows a coolant circuit for the air conditioner. The coolant circuit includes: a compressor 31 structured to compress the coolant in gas phase; a condenser 32 structured to cool and condense the coolant in gas phase that has been pressed and heightened in temperature and pressure; and an evaporator 33 including an expansion valve structured to cool the vehicle interior etc. by expand the coolant that has become liquid.

According to the present embodiment, condenser 32 is composed of water-cooled condenser 24 and an air-cooled condenser 27. According to the first embodiment, water-cooled condenser 24 is disposed relatively upstream in flow of the coolant, and the condense of the coolant is performed mainly in water-cooled condenser 24. Air-cooled condenser 27 is disposed relatively downstream, and serves as a subcooler structured to further subcool the coolant that has become liquid. Water-cooled condenser 24 bears a considerable part of a heat exchange amount required for condenser 32, which allows air-cooled condenser 27 to be downsized.

Secondary radiator 18 of the second cooling water circuit is disposed in front of primary radiator 9 of the first cooling water circuit, so as to overlap with a first part of primary radiator 9. Similarly, air-cooled condenser 27 is disposed in front of primary radiator 9 so as to overlap with a second part of primary radiator 9. Secondary radiator 18 and air-cooled condenser 27 are arranged adjacently to each other in the vertical direction or the vehicle width direction, along a plane parallel with primary radiator 9. In the drawing, secondary radiator 18 and air-cooled condenser 27 are arranged adjacently in the vertical direction, where secondary radiator 18 occupies an upper position, and air-cooled condenser 27 occupies a lower position.

Secondary radiator 18 and air-cooled condenser 27 arranged adjacently in the vertical direction define an entire external shape corresponding to an external shape of primary radiator 9. In detail, these three heat exchangers are equal to each other in dimension in the vehicle width direction, and the combination of secondary radiator 18 and air-cooled condenser 27 has an entire outline that basically coincides with an outline of primary radiator 9. Thus, cooling wind that has passed through secondary radiator 18 or air-cooled condenser 27 positioned upstream passes next through primary radiator 9 positioned downstream. As shown in the drawing, secondary radiator 18 is greater in vertical dimension than air-cooled condenser 27.

FIG. 3 shows how the three heat exchangers (i.e. primary radiator 9, secondary radiator 18, and air-cooled condenser 27) are arranged in vehicle body 2. Vehicle body 2 includes a bumper 40, a grille opening 41, and a bumper opening 42. Grille opening 41 is formed above bumper 40, for introduction of vehicle traveling wind into an engine room. Bumper opening 42 is formed below bumper 40, similarly for the introduction of vehicle traveling wind. Primary radiator 9 is disposed behind grille opening 41 and bumper opening 42, so as to receive both of the vehicle traveling wind introduced through grille opening 41 and the vehicle traveling wind introduced through bumper opening 42. Secondary radiator 18 is disposed to overlap with an upper part of primary radiator 9, so as to receive mainly the vehicle traveling wind introduced through grille opening 41. Air-cooled condenser 27 is disposed to overlap with a lower part of primary radiator 9, so as to receive mainly the vehicle traveling wind introduced through bumper opening 42.

Electric fans 15 disposed behind primary radiator 9 is driven by a controller not shown, and forcibly sends cooling wind to primary radiator 9, secondary radiator 18, and air-cooled condenser 27. This is implemented, for example, in case of a low vehicle speed and a high cooling water temperature in the first or second cooling water circuit, or in case of operation of the air conditioner for the vehicle interior. The pair of electric fans 15 are provided with shroud 16 having the rectangular external shape so as to send the cooling wind to a wide area on primary radiator 9. Shroud 16 includes a pair of circular openings inside each of which a corresponding one of the pair of electric fans 15 rotates.

The above configurations according to the present embodiment presents high flexibility in layout inside the engine room, because intercooler 3 used for cooling of supercharge intake air is water-cooled one. This serves to avoid increase in intake pressure loss and intake passage volume due to increase in length of intake system pipes. Furthermore, water-cooled intercooler 3 is the two-stage type water-cooled intercooler, and thereby allows intake air to be cooled to a lower temperature freely from restriction caused due to a relatively high temperature of the engine cooling water. The engine cooling water absorbs a considerable part of heat of the supercharge intake air, and thereby decreases an amount of heat to be absorbed by the intercooler cooling water. This serves to downsize secondary radiator 18 while incorporating drive system electrical components 21 and water-cooled condenser 24 into the second cooling water circuit that depends on secondary radiator 18.

In the second cooling water circuit, the intercooler cooling water flows parallelly into three parts: second core 6 of intercooler 3, drive system electrical components 21, and water-cooled condenser 24. This suppresses each of the three parts from undergoing affection due to a heat load in another, and allows the three parts to be certainly maintained low in temperature.

Condenser 32 includes the combination of water-cooled condenser 24 and air-cooled condenser 27. This serves to downsize air-cooled condenser 27 serving as the subcooler.

This allows air-cooled condenser 27 and secondary radiator 18 to be arranged adjacently and be disposed within external dimensions that are substantially equal to external dimensions of primary radiator 9.

This allows the three heat exchangers to be stacked in two tiers in a frontward and backward direction of the vehicle, while avoiding a layout to stack the three heat exchangers in three tiers. Although water-cooled intercooler 3 formed as the two-stage type water-cooled intercooler increases an amount of heat introduced into the engine cooling water, the two-tier layout improves heat radiation performance of primary radiator 9 disposed in the rear tier, and serves to secure a sufficient heat radiation amount without increasing a heat radiation area of primary radiator 9.

The above-described layout of the heat exchangers in which air-cooled condenser 27 is disposed below secondary radiator 18 presents an advantage against foreign substances such as pebbles coming through bumper opening 42 during vehicle traveling. Specifically, while a radiator for cooling of cooling water generally includes minute tubes that are likely to be damaged due to collision with pebbles etc., the condenser for the air conditioner which is structured to cool high-pressure coolant with outside air includes relatively tough tubes that are less in concern about the damage due to collision with pebbles etc. Accordingly, it is favorable to dispose air-cooled condenser 27 at the lower position greater in possibility of the collision with pebbles etc., and dispose secondary radiator 18 at the upper position less in possibility of the collision with pebbles etc. Such layout eliminates necessity for adding a chipping guard described below behind bumper opening 42.

Figure 7:
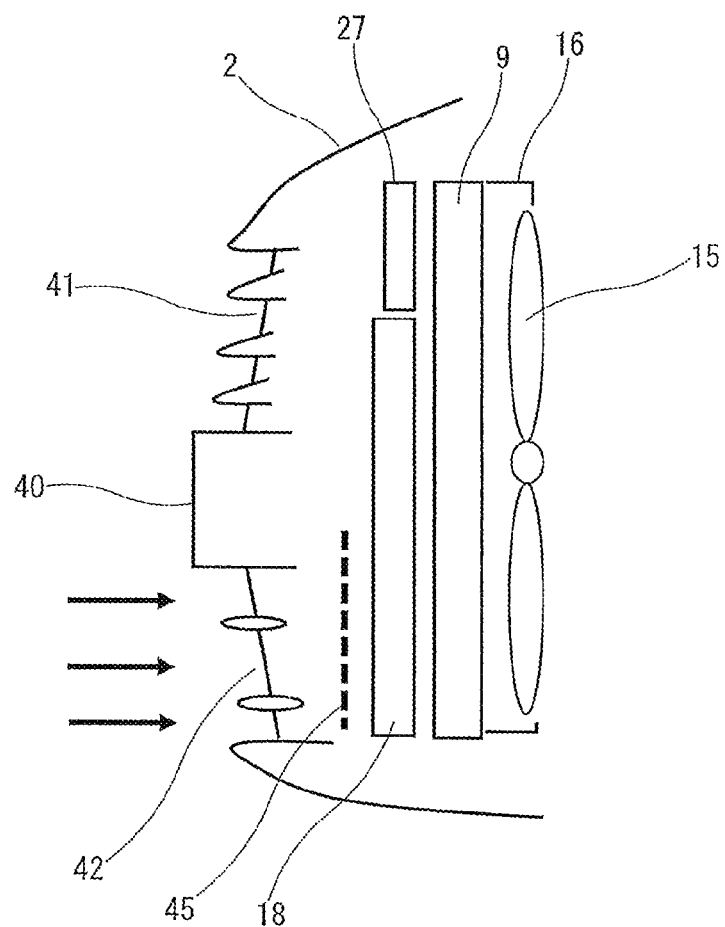
FIG. 7 is a schematic view showing a second embodiment when viewed from the lateral side of the vehicle.

FIG. 7 shows a second embodiment in which secondary radiator 18 is disposed below air-cooled condenser 27, contrarily to the layout shown in FIG. 3. Secondary radiator 18 is disposed to overlap with a lower part of primary radiator 9, so as to receive vehicle traveling wind introduced through bumper opening 42 and a lower part of grille opening 41. Air-cooled condenser 27 is disposed to overlap with an upper part of primary radiator 9, so as to receive vehicle traveling wind introduced through mainly an upper part of grille opening 41. Similarly to the first embodiment, the combination of air-cooled condenser 27 and secondary radiator 18 arranged adjacently in the vertical direction has the entire external shape corresponding to the external shape of primary radiator 9. The second embodiment employs a chipping guard 45 disposed behind bumper opening 42. Chipping guard 45 is a grid-like or net-like one, and serves to prevent secondary radiator 18 from undergoing the collision with pebbles etc. coming through bumper opening 42.

The invention claimed is:

1. A heat exchange device for a vehicle, the heat exchange device comprising:
- a water-cooled engine structured to be cooled by first cooling water;
- a two-stage type water-cooled intercooler that is structured to cool supercharge intake air supplied to the water-cooled engine, and includes a first core structured to perform cooling with the first cooling water and a second core structured to perform cooling with second cooling water, wherein the first core is disposed upstream on an intake path with respect to the second core;
- a water-cooled condenser structured to cool coolant for an air conditioner with use of the second cooling water that is introduced parallelly into the water-cooled condenser and the second core of the two-stage type water-cooled intercooler;
- a first radiator disposed at a position to receive wind due to vehicle traveling, and structured to cool the first cooling water by heat exchange with air;
- a second radiator disposed in front of the first radiator so as to overlap with a part of the first radiator, and structured to cool the second cooling water by heat exchange with air; and
- an air-cooled condenser disposed in front of the first radiator adjacently to the second radiator so as to overlap with a part of the first radiator, and arranged in series with the water-cooled condenser in a coolant circuit for the air conditioner, and structured to cool the coolant by heat exchange with air, wherein:
- the vehicle is a series hybrid vehicle structured to generate electric power with a generator driven by the water-cooled engine and travel by driving a motor with the generated electric power; and
- the second core and the water-cooled condenser are arranged in parallel with a drive system electrical component cooling water circuit that is structured to cool a drive system electrical component with use of the second cooling water.

2. The heat exchange device as claimed in claim 1, wherein the air-cooled condenser is disposed downstream in the coolant circuit with respect to the water-cooled condenser, and serves as a subcooler.

3. The heat exchange device as claimed in claim 1, wherein the air-cooled condenser is disposed adjacently to the second radiator, below the second radiator.

4. The heat exchange device as claimed in claim 1, wherein the second cooling water is controlled to be lower in temperature than the first cooling water.

5. The heat exchange device as claimed in claim 1, wherein the first radiator has an external shape corresponding to an entire external shape of a combination of the second radiator and the air-cooled condenser arranged adjacently to each other.

* * * * *